US012808630B2

(12) United States Patent
Szymiczek

(10) Patent No.: US 12,808,630 B2
(45) Date of Patent: Nov. 24, 2026

(54) TELESCOPIC SIGHT SYSTEM

(71) Applicant: Carl Zeiss AG, Oberkochen (DE)

(72) Inventor: David Szymiczek, Oberkochen (DE)

(73) Assignee: Carl Zeiss AG, Oberkochen (DE)

(*) Notice: Subject to any disclaimer, the term of this patent is extended or adjusted under 35 U.S.C. 154(b) by 107 days.

(21) Appl. No.: 18/900,869

(22) Filed: Sep. 29, 2024

(65) Prior Publication Data

US 2025/0109929 A1 Apr. 3, 2025

(30) Foreign Application Priority Data

Sep. 29, 2023 (DE) ..................... 10 2023 209 624.2
Sep. 17, 2024 (DE) ..................... 10 2024 208 887.0

(51) Int. Cl.

*F41G 1/387* (2006.01)
*F41G 1/54* (2006.01)
*G02B 23/14* (2006.01)
*G02B 23/16* (2006.01)

(52) U.S. Cl.

CPC ............ *F41G 1/387* (2013.01); *F41G 1/545* (2013.01); *G02B 23/14* (2013.01); *G02B 23/16* (2013.01)

(58) Field of Classification Search

CPC ................................ G02B 23/14; G02B 23/16
See application file for complete search history.

(56) References Cited

U.S. PATENT DOCUMENTS

| | | | |
|---|---|---|---|
| 8,928,878 | B2 | 1/2015 | Jaeschke et al. |
| 9,989,362 | B2 | 6/2018 | Öttl et al. |
| 10,012,476 | B2 | 7/2018 | Öttl |
| 10,724,829 | B1 | 7/2020 | Ding et al. |

(Continued)

FOREIGN PATENT DOCUMENTS

| | | |
|---|---|---|
| DE | 29720737 U1 | 3/1998 |
| DE | 202006003770 U1 | 7/2006 |

(Continued)

OTHER PUBLICATIONS

Office Action dated May 23, 2025, issued in Austrian counterpart application No. A 50766/2024 and English-language translation thereof.

(Continued)

*Primary Examiner* — Paisley L Wilson
(74) *Attorney, Agent, or Firm* — Ewers IP Law PLLC; Falk Ewers

(57) ABSTRACT

A telescopic sight system includes a telescopic sight and a setting assembly. The telescopic sight has a housing, an objective lens assembly, a reticle element, an adjustment mechanism, and an adjustment turret. The setting assembly can be reversibly coupled to the adjustment turret and has a coupling peg and a peg carrier. A receiving shaft and a blocking spring are arranged in the adjustment turret. The coupling peg has two annular grooves. A groove bottom of the first annular groove is arranged at a smaller spacing than the spring width from an outer edge of the receiving shaft. The second annular groove is recessed with respect to the first annular groove. The blocking spring lies in the first annular groove when the coupling peg has been arranged in the fixing position, and in the second annular groove when the coupling peg has been arranged in the release position.

12 Claims, 7 Drawing Sheets

(56) References Cited

U.S. PATENT DOCUMENTS

| | | | | |
|---|---|---|---|---|
| 10,976,133 | B2 | 4/2021 | Hofmann et al. | |
| 2013/0276345 | A1* | 10/2013 | Hamilton ............... | G02B 23/16<br>42/119 |
| 2018/0120060 | A1 | 5/2018 | Schmidt | |

FOREIGN PATENT DOCUMENTS

| | | | |
|---|---|---|---|
| DE | 102011013456 | A1 | 9/2012 |
| DE | 102015104128 | A1 | 9/2016 |
| DE | 102017104770 | A1 | 9/2018 |
| EP | 2684005 | B1 | 5/2015 |
| EP | 3034982 | B1 | 1/2018 |
| EP | 3315893 | A1 | 5/2018 |
| EP | 3034981 | B1 | 11/2019 |
| GB | 2489783 | B | 10/2015 |

OTHER PUBLICATIONS

Austrian Office Action dated Oct. 17, 2024 of Austrian counterpart application No. A 50322/2024-1 and English Language Translation thereof.

* cited by examiner

TELESCOPIC SIGHT SYSTEM

CROSS REFERENCE TO RELATED APPLICATIONS

This application claims priority to German patent applications DE 10 2023 209 624.2 filed on Sep. 29, 2023, and DE 10 2024 208 887.0 filed on Sep. 17, 2024, the entire content of these applications is incorporated herein by reference.

TECHNICAL FIELD

The disclosure relates to a telescopic sight system having a telescopic sight, in particular a telescopic sight for hunting and/or sports purposes.

BACKGROUND

Telescopic sights are optical units that enable observation of a target with (generally) enlarged size (to some extent even also reduced size) and usually have a so-called reticle (in simple form and commonly also referred to as "crosshairs"). The reticle normally coincides with the optical axis of the telescopic sight. The reticle serves for aiming, which is to say for sighting the target, and optionally also for estimating the distance to the target. In technical terms, two forms are conventional in this respect, and they differ in the arrangement of the element ("reticle element") that generates the (optically identifiable) reticle. In one form, the reticle element is arranged in a first (object-side) intermediate image plane (usually between an objective part and an inverting system of the telescopic sight), and in the other form it is arranged in a second (image-side) intermediate image plane (usually between the inverting system—or at its image-side end—and an eyepiece).

In the theoretical basic state, for use a telescopic sight is coupled to a firearm, usually a rifle, in such a way that a so-called sighting line is aligned (at least approximately) parallel to the ideal (i.e., uninfluenced and straight) flight path of the corresponding projectile. Since (ballistic) projectiles under standard conditions have a curved (at least roughly parabolic) flight path, however, telescopic sights are usually adjusted in such a way that the flight path of the projectile intersects the sighting line in each case. Since the telescopic sight is normally mounted above the starting point of the projectile—in the case of a rifle, above the barrel—, there are therefore usually two intersection points of the flight path with the sighting line: one closest to the firearm with an ascending flight path, the other (farther away) with a descending flight path. The latter should as far as possible lie on the range of the shot.

In order to obtain as precise as possible an overlap of the sighting line, that is to say of the reticle with the point of impact, a system of firearm and telescopic sight is "homed in" to a certain range, for hunting purposes usually "zeroed" to a relatively short range of less than or up to 100 meters. In this case—normally with stationary firearms for an as high as possible repetition accuracy—an adjustment mechanism for the telescopic sight is used to make the reticle overlap the point of impact (in particular on a pane). Usually, telescopic sights to this end have a type of spindle drive, which makes it possible to adjust the height of the reticle relative to the image, more specifically to the image that a user can view through the telescopic sight. A second adjustment mechanism for lateral "correction" is often still present. For a modified range while the firearm is being used, as the range increases the reticle can be adjusted "downward", in order to avoid "holding above the target" by eye or with optical cues in the reticle. The shooter thus readjusts the modified range and continues to aim with the corresponding central marking of the reticle. For this, there is often a so-called ballistics turret, in which the adjustment mechanism is arranged, on the telescopic sight. To some extent, an external part of the adjustment mechanism, which usually has an adjustment ring, must be dismounted for the "setting to zero".

The mode of operation of the adjustment and thus also of the adjustment mechanism in this case depends on the above-described arrangement of the reticle element. If it is arranged in the first intermediate image plane, it is usually the reticle element itself which is adjusted. If, by contrast, the reticle element is arranged in the second intermediate image plane, generally the inverting system, which is fastened to an associated carrier, is tilted relative to the optical axis of the entire telescopic sight or at least of the objective and/or eyepiece, and this gives the impression that the position of the reticle itself changes. In this case, however, the reticle element usually remains (at least approximately) stationary.

In the case of some telescopic sights, however, there are no adjustment options for a normal user, and therefore the above-described homing in must be carried out for example by a skilled person, who has special tools available. Other telescopic sights, however, have such an external part (often also referred to as quick-action reticle adjustment means), in order to enable easier setting of modified heights, which is to say to further ranges. This quick-action reticle adjustment means is mounted to some extent reversibly on the respective ballistics turret of the telescopic sight. It is thus possible, with the quick-action reticle adjustment means having been mounted, for the shooter to also react "during operation" to a range which is modified in relation to the homing-in.

A disadvantage of such quick-action reticle adjustment means is that—in particular for the reversible mountability—they are usually arranged on the ballistics turret with play. Such play, however, leads to undesired noises, to haptics that are undesirable for the user, and/or also to a reduced degree of sustainability, since in the case of movements caused by recoil, components might be prematurely subjected to mechanical wear ("kicking").

SUMMARY

It is an object of the disclosure to provide an improved telescopic sight system.

This object is achieved by a telescopic sight system for hunting and/or sports purposes, by a method for mounting the telescopic sight system, and by a method for dismounting the telescopic sight system as described herein.

The telescopic sight system according to an aspect of the disclosure has a telescopic sight, which serves in particular for hunting and/or sports purposes. The telescopic sight has a housing and an objective lens assembly arranged in the housing. The telescopic sight also has a reticle element arranged in the housing, and an adjustment mechanism for adjusting the reticle element relative to an image-which a user of the telescopic sight system can view with (or through) the telescopic sight. The telescopic sight also has at least one adjustment turret, which is arranged on the housing, accommodates the adjustment mechanism, and is accessible for manual and relative adjustment of the reticle element. The telescopic sight system additionally has a setting assembly which can be reversibly coupled to the adjustment turret. This setting assembly in turn has a coupling peg and a peg carrier, in which the coupling peg is adjustably mounted between a fixing position and a release position. The coupling peg and the peg carrier serve for—typically reversible—fixing to the adjustment turret. A receiving shaft for receiving the coupling peg, and a blocking spring are arranged in the adjustment turret. The blocking spring projects laterally by a spring width into the receiving shaft. The coupling peg has, along its longitudinal extent and at an axial spacing from one another, a first annular groove and a second annular groove. A groove bottom of the first annular groove is arranged at a smaller spacing than the spring width from an outer edge of the receiving shaft. The second annular groove is recessed with respect to the first annular groove such that a groove bottom of the second annular groove is arranged at a larger spacing than the spring width or at least at a spacing approximating the spring width from the outer edge of the receiving shaft. In addition, the blocking spring lies in the first annular groove when the coupling peg has been arranged in the fixing position, and lies in the second annular groove when the coupling peg has been arranged in the release position.

The first and the second annular groove are thus configured and intended to receive the blocking spring—at least its part projecting into the receiving shaft—in respective associated positions of the coupling peg. Since the depth of the first annular groove is chosen such that the blocking spring would project further into the receiving shaft than the groove bottom of the first annular groove allows, the blocking spring is kept in a deformed state, in particular curved in the insertion direction. As a result, the blocking spring can form a type of barb against the coupling peg being pulled out, in that the blocking spring comes to bear against an edge (also referred to as "shoulder") of the first annular groove, at least whenever the coupling peg is moved counter to the insertion direction. If, by contrast, the blocking spring is introduced into the second annular groove, owing to the chosen size of the second annular groove the blocking spring has more clearance for deformation and/or more freedom of movement, with the result that the blocking spring can return to a neutral position by itself or by applying a mounting force. As a result, the barb action of the blocking spring goes away, and the complete coupling peg can be taken back out of the receiving shaft.

"Relative adjustment" of the reticle element with respect to the viewable image is understood here and in the following text in particular to mean that optionally the reticle element itself is offset for example transversely to an optical axis of the telescopic sight (in particular of the objective lens assembly) or else other optical elements within the telescopic sight are adjusted, such that the position of the reticle generated by the reticle element (for example a line marking, a point of light, a crosshair or the like) on (or in) the image that the user can view changes.

According to an exemplary embodiment, the coupling pin has a rotationally symmetrical form. The peg carrier is typically in the form of a sleeve. The coupling peg is expediently mounted on the peg carrier so as to be adjustable with respect to said peg carrier with a slotted link. In particular, the coupling peg can thus be displaced by turning it between the fixing position and the release position. This constitutes a relatively compact and straightforward adjustability.

The receiving shaft is typically formed by a sleeve-like component of the adjustment turret or of the adjustment mechanism. For example, this sleeve-like component forms a toothing, with which a mating piece of the setting assembly can be brought into engagement, in order to allow an adjustment of the reticle element.

According to another exemplary embodiment, the above-described slotted link has at least one slotted-link groove and (in particular in each case) a slotted-link pin slidably received therein. With preference, the (or the respective) slotted-link groove is formed in the peg carrier and the (or the respective) slotted-link pin is fastened in the coupling peg. The slotted-link groove additionally has a release portion, which is aligned parallel or at least virtually parallel to the longitudinal extent (or else axis of rotation or longitudinal axis) of the coupling peg and points with a free end in the insertion direction of the adjustment turret, and a fixing portion, which is at an angle relative to said release portion.

The coupling peg is thus moved along the course of the slotted-link groove, and thus in two directions at an angle to one another, for adjustment between the fixing position and the release position. In particular, the coupling peg is moved away from the fixing portion along the release portion for adjustment into the release position and correspondingly in reverse for adjustment into the fixing position.

The fixing portion is typically aligned with a small gradient with respect to a plane radial to the coupling peg and with a free end pointing away from the insertion direction of the adjustment turret. In particular, the fixing portion of the slotted-link groove is thus inclined relative to the longitudinal axis of the coupling peg, with the result that, when the slotted-link pin is being moved in the direction toward the free end of the fixing portion, the coupling peg moves—at least assuming or presupposing that the peg carrier remains stationary with respect to the insertion direction—counter to the insertion direction. The coupling peg is also typically arranged in the fixing position when the slotted-link pin is arranged at the free end of the fixing portion. Optionally, the slotted-link groove at its free end has a slight widening, in particular toward the insertion direction, in which the slotted-link pin can lie in latched-in fashion in the fixing position. This inclined position of the fixing portion, for example of up to 10 degrees with respect to the radial plane of the coupling peg and typically also of the peg carrier, thus causes a type of screwing movement of the coupling peg, as a result of which it can—possibly again—be braced against the blocking spring by way of the groove edge of the first annular groove (in particular the groove edge delimiting the first annular groove in the insertion direction). This compensates for an often-present, tolerance-related play and enables a play-free mounting state.

According to an exemplary embodiment, the blocking spring is a toroidal helical spring. "Toroidal" in this case means that the helical spring forms a closed ring. In particular, the helical spring forms a radially coiled axial spring. The helical spring acts in the axial direction. In particular, an inside diameter of the ring formed by the helical spring is less than the outside diameter of the first annular groove, specifically of the groove bottom of the first annular groove. The difference between the inside diameter of the receiving shaft and the inside diameter of the ring formed by the helical spring thus forms the aforementioned spring width.

In particular, the helical spring is also flattened or "compressed" in the axial direction. As a result, the toroidal helical spring can advantageously be deflected by way of its inner edge with respect to the outer edge and thus in particular act in a comparable way to an annular disk.

In an alternative exemplary embodiment, the blocking spring is an annular disk or a plate spring with a central opening. Optionally, this plate spring or ring disk has tongues protruding inward from an edge region. In this case, the blocking spring also forms a type of diaphragm spring. The above statements about the inside diameter of the toroidal helical spring analogously also relate to the annular disk and/or the plate spring.

Moreover, in an exemplary embodiment the outside diameter of the groove bottom of the second annular groove is less than the inside diameter of the toroidal helical spring, of the annular disk and/or of the plate spring. This advantageously makes it possible for the respective blocking spring, if the coupling peg is arranged in the release position, in the second annular groove to return to the respective rest position or neutral position. If then subsequently the coupling peg—in particular together with the shaft carrier—is taken out of the receiving shaft, the blocking spring in the second annular groove is deflected in the pull-out direction and can thus slide across the groove edges of the first annular groove without being supported against one of the two groove edges in the pull-out direction. In particular, however, when the coupling peg after reaching the release position is taken out of the receiving shaft until the blocking spring lies in the first annular groove again and then is moved in the insertion direction again, the blocking spring would then “press” against the other groove edge, since the blocking spring is deflected in the opposite direction in the meantime. As a result, the actual fixing position can no longer be reached. Rather, the coupling peg must first be taken out of the receiving shaft before renewed mounting into the fixing position is possible.

The peg carrier is typically coupled to a structural element, which encloses the peg carrier and the coupling peg in sleeve-like fashion, of the setting assembly for conjoint rotation. In particular, this structural element is also rotationally conjointly guided on the adjustment turret in a basic position, once the coupling peg has been introduced deep enough into the receiving shaft. The latter can be identified in particular by the fact that the blocking spring snap-fitting into the first annular groove is typically acoustically audible or else can be haptically felt and additionally the setting assembly can no longer be taken off of the adjustment turret (at least not without being subjected to a load beyond that of a routine mounting force). The above-described rotationally conjoint coupling of the peg carrier (at least in the basic position of the aforementioned sleeve-like structural element) is advantageous for the adjustment of the coupling peg into the fixing position—in particular rotating it along the slotted-link groove.

The coupling peg is further typically accessible from an outer side of the setting assembly only with a tool, for example a hexagon key or the like, so that a tool is always necessary for the turning with respect to the peg carrier. For example, the setting assembly to this end has a cover, which covers at least the peg carrier and has an opening, through which the coupling peg is accessible only with the tool, but not by hand.

A mounting sequence for the setting assembly, which overall typically forms the above-described quick-action reticle adjustment means, in particular includes the following steps, which also form a mounting and/or dismounting method that is inventive per se:

- placing the setting assembly on the adjustment turret in such a way that the coupling peg lies in the receiving shaft;
- (in particular manually) inserting the coupling peg into the receiving shaft, in particular by exerting pressure on the setting assembly, in particular the aforementioned cover, in the insertion direction, typically until the blocking spring snap-fits into the first annular groove; typically, owing to the above-described accessibility by virtue of the cover, the coupling peg cannot be displaced beyond a pre-fixing position, in which the blocking spring snap-fits into the first annular groove but is not yet braced against the groove edge by turning the coupling peg, in the direction toward the release position. This is made possible, for example, in that the peg carrier bears (at least indirectly) against an (in particular the aforementioned sleeve-like) component of the adjustment turret, in particular a border of the receiving shaft, and thus cannot move further in the insertion direction;
- typically subsequently turning the coupling peg, in particular with the above-described tool, with respect to the peg carrier, the coupling peg moving along the slotted link, in particular along the fixing portion, and in the process the blocking spring is braced against the groove edge of the first annular groove;
- for dismounting—typically first of all turning the coupling peg in the opposite direction (to the mounting), until the slotted-link pin has slid into the release portion and subsequently—inserting the coupling peg, in particular along the release portion, in the insertion direction—in particular with the tool through the opening in the cover—until the blocking spring lies in the second annular groove and can move back into its rest position in the process; then taking the setting assembly off of the adjustment turret (or else: removing it therefrom).

Here and in the following text, the conjunction “and/or” is intended to be understood such that the features linked by this conjunction can be formed both together and as alternatives to one another.

BRIEF DESCRIPTION OF THE DRAWINGS

The disclosure will now be described with reference to the drawings wherein.

DESCRIPTION OF EXEMPLARY EMBODIMENTS

Parts that correspond to one another are always provided with the same reference signs in all of the figures.

Figure 1:
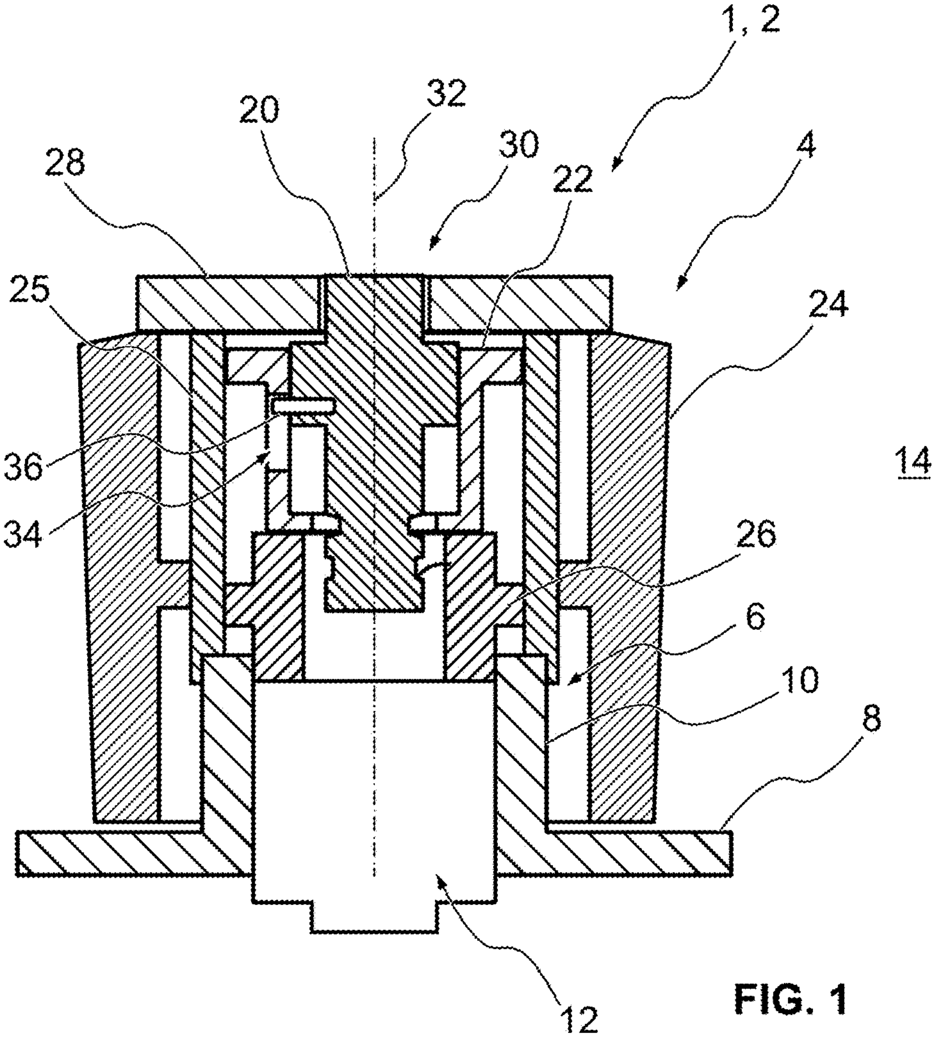
FIG. 1 shows a schematic view, in partial section, of a detail of a telescopic sight having an adjustment turret and a setting assembly fastened thereto.
Figure 8:
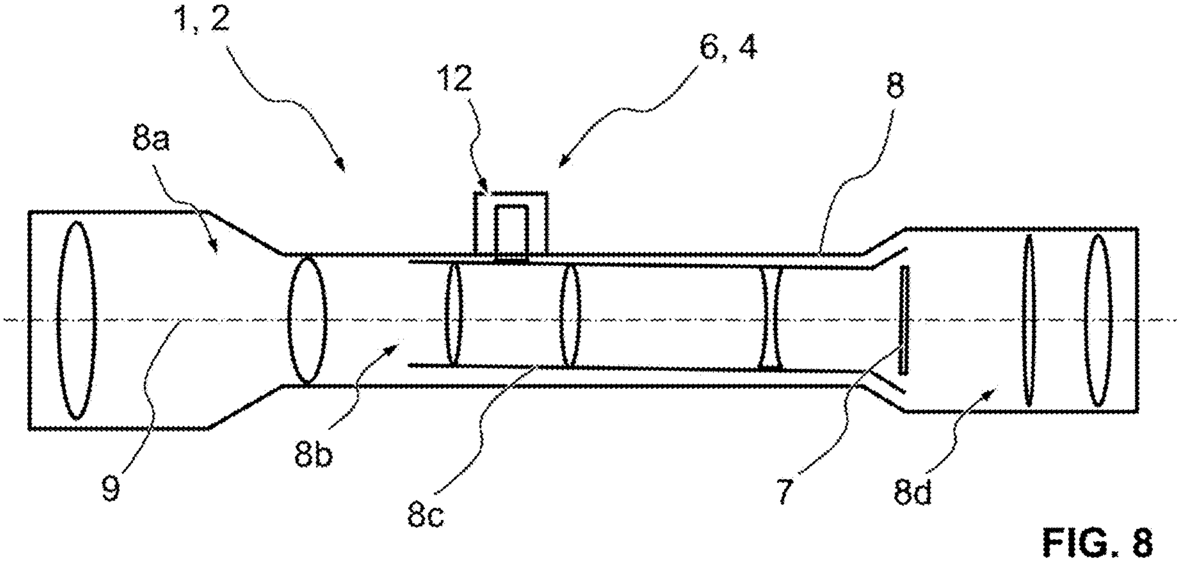
FIG. 8 shows a schematic illustration of the telescopic sight system.

FIG. 1 shows a detail of a telescopic sight system 1 (also schematically illustrated in FIG. 8), which includes a telescopic sight 2 and a setting assembly 4. Of the telescopic sight 2, an adjustment turret 6 for a reticle element 7, not illustrated in more detail, and part of a tubular (outer) housing 8 are illustrated. In the housing 8, multiple lenses are arranged one after another along an optical axis and form at least one objective lens assembly 8*a* (cf. diagram according to FIG. 8). In the present exemplary embodiment, a further lens assembly, not illustrated in more detail, forms a so-called inverting system 8*b*, which is arranged in an "inner tube" 8*c*, i.e., a tubular holder, on the image side following the objective lens assembly 8*a* in the housing 8. A further lens assembly, not illustrated in more detail, which forms an eyepiece 8*d* is arranged in the housing 8 on the image side following this inverting system 8*b*. An adjustment mechanism 12—here to some extent only schematically depicted—is arranged in the adjustment turret 6, which includes a collar 10 formed on the housing 8, such that the adjustment mechanism is accessible from an outer side 14. The adjustment mechanism 12 in the present exemplary embodiment acts on the inner tube 8*c* and in so doing causes the inverting system 8*b* to tilt with respect to an optical axis 9 of the objective lens assembly 8*a* and of the eyepiece 8*d*. The reticle element 7 is arranged at the image-side end of the inverting system 8*b* at the point of rotation of the inner tube 8*c*, such that the reticle element 7 itself remains virtually stationary. A relative adjustment of the reticle (for example a point of light, a "crosshair" or the like) generated by the reticle element 7 in the image that a user can view is brought about here by the tilting of the inverting system 8*b* (illustrated in exaggerated fashion in FIG. 8).

In an alternative exemplary embodiment which is not illustrated, the reticle element 7 is arranged between the objective lens assembly 8*a* and the inverting system 8*b*. In this case, the adjustment mechanism 12 acts on the reticle element 7 and offsets it relative to the optical axis 9 of the objective lens assembly 8*a*.

The setting assembly 4 can be reversibly coupled to the telescopic sight 2, specifically to the adjustment mechanism 12.

The setting assembly 4 thus in the intended state of use serves to enable an adjustment of the reticle element 7 with the adjustment mechanism 12, in order for example to compensate for a modified range to the target. The setting assembly 4 has a coupling peg 20 and a peg carrier 22. In addition, the setting assembly 4—in this case only schematically illustrated—has an (in particular sleeve-like) outer ring 24, which is configured for manual adjustment by a user of the telescopic sight 2. This outer ring 24 acts—here indirectly via an (in particular sleeve-like) intermediate piece 25—on a spindle sleeve 26 of the adjustment mechanism 12. The spindle sleeve 26 serves to transmit an adjustment movement to the downstream elements of the adjustment mechanism 12. In addition, the setting assembly 4 has a cover 28, which covers the coupling peg 20 and the peg carrier 22 except for a tool opening 30.

Figure 2:
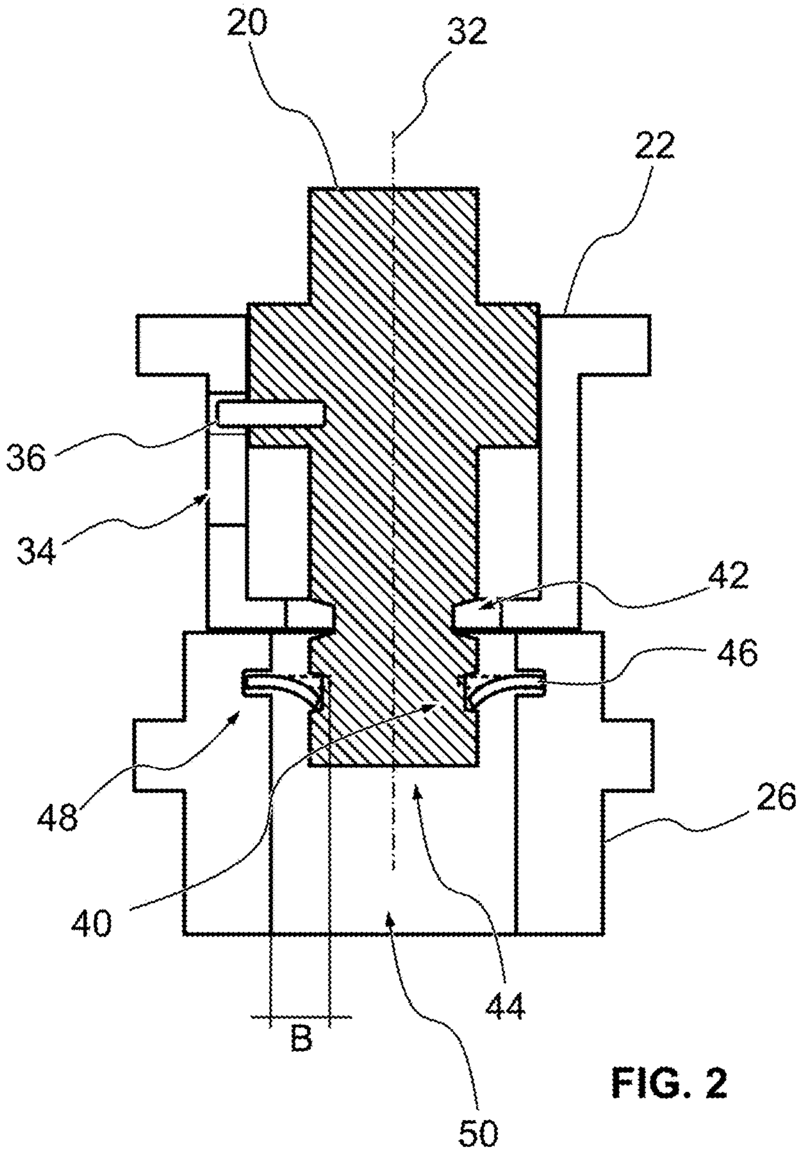
FIG. 2 shows an enlarged view of a detail of the adjustment turret and the setting assembly.
Figure 3:
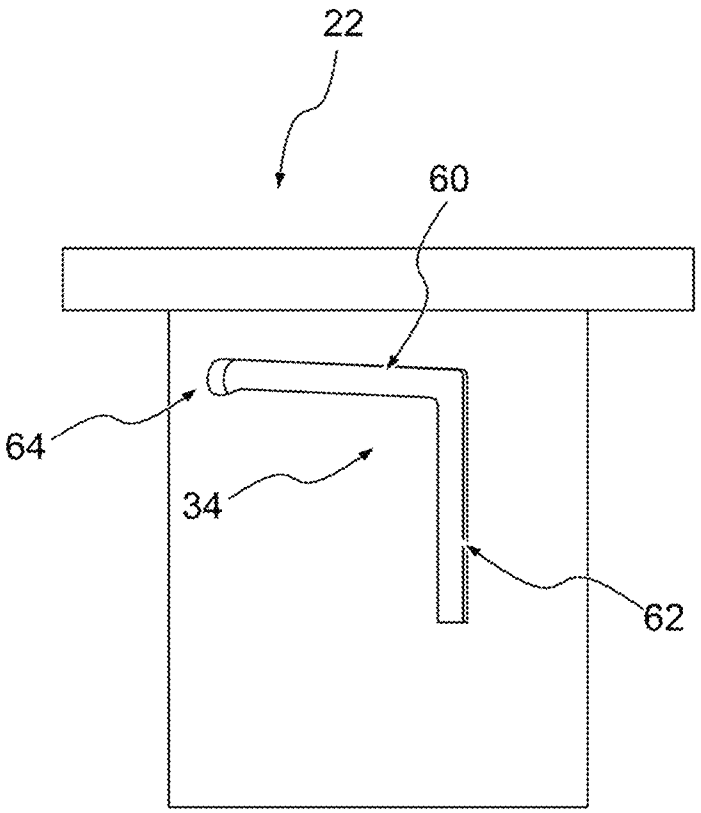
FIG. 3 shows an individual view of a structural element of the setting assembly.
Figure 4:
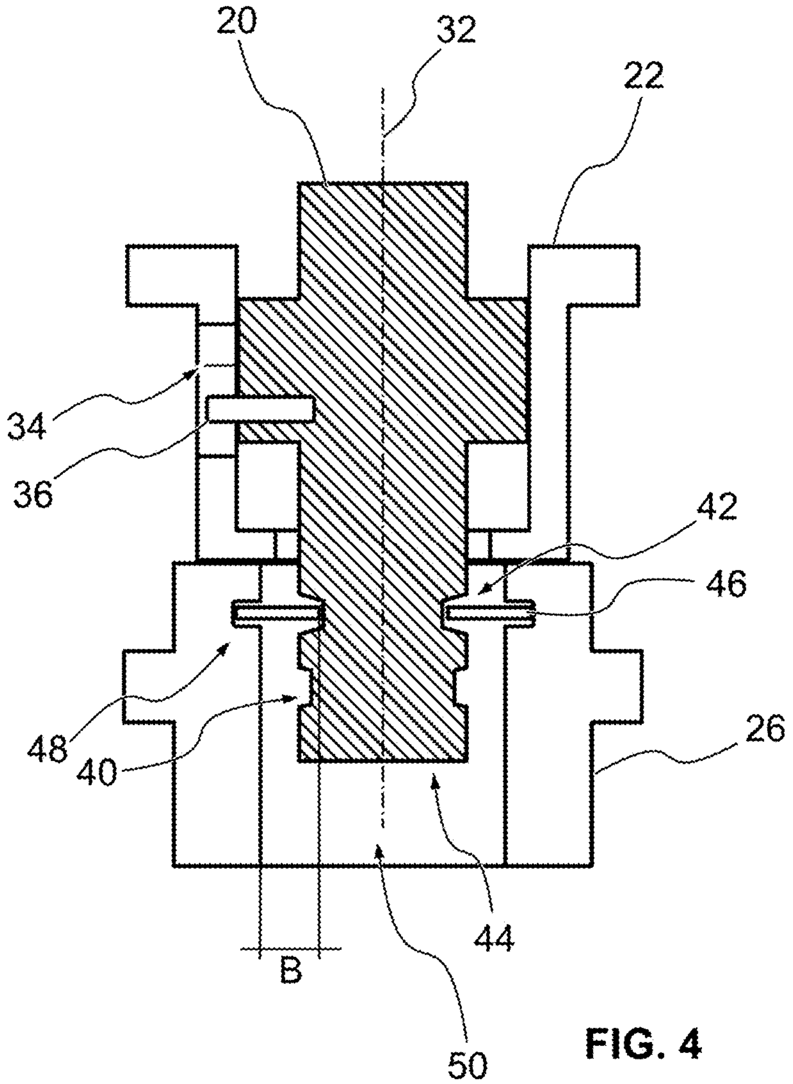
FIGS. 4 and 5 show, in a view according to FIG. 2, a respective different mounting position of the setting assembly.
Figure 5:
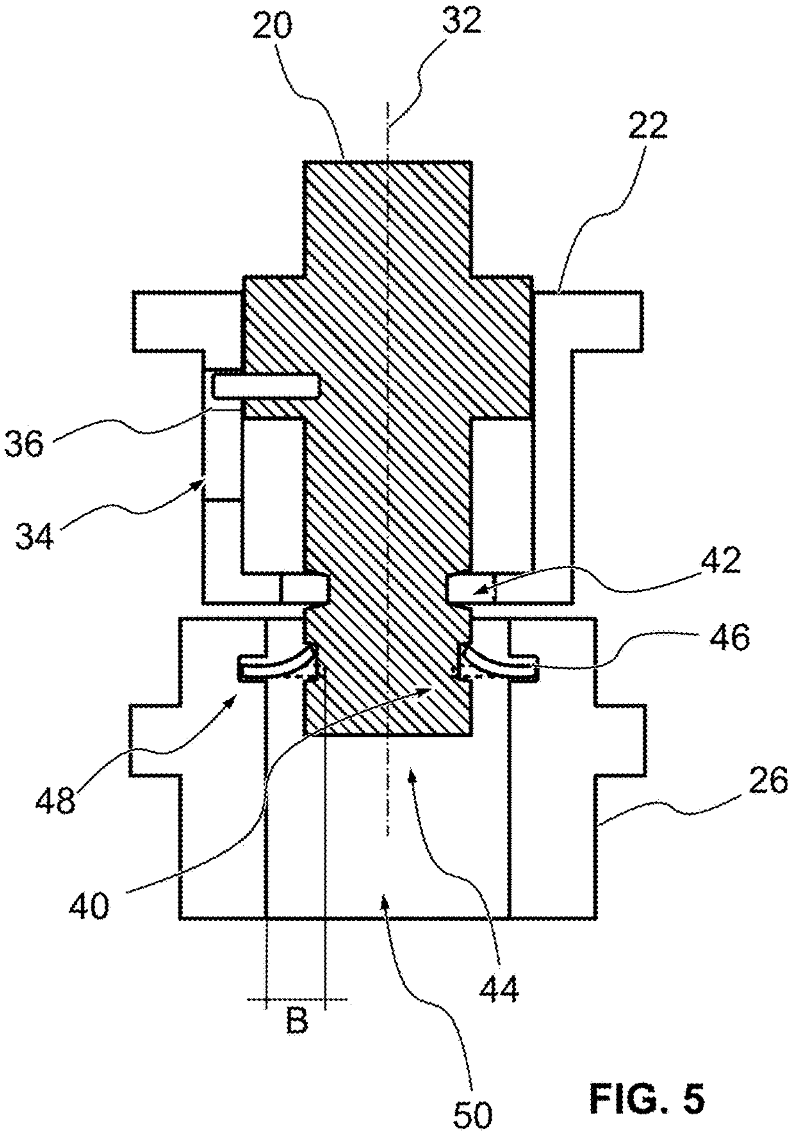

The coupling peg 20 has a rotationally symmetrical form with respect to a longitudinal axis 32 and is surrounded by the peg carrier 22, which has the form of a pot-like sleeve (see FIGS. 2 and 3). A slotted-link groove 34, in which the coupling peg 20 is displaceably mounted and fastened with a slotted-link pin 36, is formed in the peg carrier 22. The slotted-link pin 36 is fastened, for example pressed, adhesively bonded or screwed, in the coupling peg 20. The slotted-link groove 34 and the slotted-link pin 36 together form a slotted link.

As shown in FIG. 2, the coupling peg 20 has a first annular groove 40 and a second annular groove 42. The first annular groove 40 is arranged closer to an insertion end 44 than the second annular groove 42 is. In addition, an (inside) diameter of the groove bottom of the first annular groove 40 is larger than the diameter of the second annular groove 42 on its groove bottom. A blocking spring 46 is fastened on the inside of the spindle sleeve 26. In the present exemplary embodiment, for illustration purposes this blocking spring lies in an internal groove 48 in the spindle sleeve 26 and in its rest position (see FIG. 4, indicated in dashed lines in FIG. 2) projects by a spring width B into a receiving shaft 50, which is predefined by the spindle sleeve 26. FIG. 1 depicts only a single spring tongue as blocking spring 46. FIG. 2 and FIGS. 4 to 7 each illustrate annular blocking springs 46, which will be discussed in more detail below.

The spring width B is chosen such that it is larger than the distance of the groove bottom of the first annular groove 40 from the inner surface of the receiving shaft 50. In the case of the annular blocking spring 46, it thus reduces the inside diameter of the receiving shaft 50 by twice the spring width B.

When the setting assembly 4 is being mounted, it is placed with the coupling peg 20 onto the spindle sleeve 26, such that the coupling peg 20 can be inserted into the receiving shaft 50. The blocking spring 46 is arranged such that it is arranged at the position of the first annular groove 40 of the coupling peg 20, when the latter is aligned in a pre-mounting position with respect to the peg carrier 22. As a result, when the coupling peg 20 is being inserted into the receiving shaft 50 by way of its insertion end 44, it causes the blocking spring 46 to deflect in the insertion direction (which is to say in the direction toward the inside of the adjustment turret 6 and of the housing 8). When the coupling peg 20 reaches a pre-mounting position, in which the peg carrier 22 bears against the spindle sleeve 26, the blocking spring 46 snap-fits into the first annular groove 40. Since the spring width B is larger than the spacing of the groove bottom of the first annular groove 40 from the spindle sleeve 26—in the case of the annular blocking spring 46, the inside diameter thereof is thus smaller than the diameter of the groove bottom of the first annular groove 40—the blocking spring 46 cannot return to its rest position, but stays deflected in the insertion direction and therefore braced against the first annular groove 40 (see FIG. 1 and FIG. 2). As a result, the blocking spring 46 forms a type of barb, which retains the setting assembly 4 against being taken out of the adjustment turret 6.

In order to compensate for any remaining play between the setting assembly 4 and the adjustment turret 6, here specifically the spindle sleeve 26, the slotted-link groove 34 is subdivided into two portions, i.e., a fixing portion 60 and a release portion 62 (see FIG. 3). The release portion 62 is aligned parallel to the longitudinal axis 32 of the coupling peg 20, with the result that the coupling peg 20 can be displaced in a straight line and parallel to the longitudinal axis 32 in the slotted-link groove 34, when the slotted-link pin 36 is arranged in the release portion 62. The fixing portion 60 is inclined approximately 5 degrees with respect to a radial plane to the longitudinal axis 32 (thus approximately 95 degrees in relation to the release portion 62), with the result that a free end 64 of the fixing portion 60 points away from the adjustment turret 6 in the mounted state of the latter. If now the coupling peg 20 is turned with respect to the peg carrier 22—in the present exemplary embodiment approximately 45 degrees clockwise—such that the slotted-link pin 36 is moved toward the free end 64, the coupling peg 20 is pulled away from the spindle sleeve 26. The peg carrier 22 is indirectly coupled to the outer ring, such that an undesired conjoint rotation with the coupling peg 20 can be prevented. As a result, the blocking spring 46 continues to be braced in the first annular groove 40, specifically against its insertion-side groove edge. This reduces any play present between the setting assembly 4 and the adjustment turret 6 and/or braces the setting assembly 4 against the adjustment turret 6.

To "secure" the coupling peg 20 in a fixing position (which is to say, when the slotted-link pin 36 is arranged at the free end 64), the free end 64 of the slotted-link groove 34 is recessed toward the spindle sleeve 26 in the manner of a pocket, with the result that a form fit is provided against the coupling peg 20 simply rotating back again. For the turning operation, a tool, in the present exemplary embodiment a hexagon key, is plugged through the tool opening 30 into a correspondingly formed drive of the coupling peg 20. In this case, the tool opening 30 is dimensioned such that manual operation of the coupling peg 20, at least counter to the (frictional) resistance of the blocking spring 46, is not possible.

For dismounting, the coupling peg 20 is turned counterclockwise with respect to the peg carrier 22. As a result, the slotted-link pin 36 enters the release portion 62. Here, the coupling peg 20 can now be displaced further in the insertion direction (that is to say, into the receiving shaft 50) with the hexagon key. In the process, the blocking spring 46 snap-fits into the second annular groove 42. This position is also referred to as release position of the coupling peg 20. The diameter of the groove bottom of the second annular groove 42 is chosen such that the groove bottom has a larger spacing from the spindle sleeve 26 than the spring width B—in the case of the annular blocking spring 46, its inside diameter is thus larger than that of the groove bottom of the second annular groove 42. As a result, the blocking spring 46 in the second annular groove 42 can return to the rest position. The above-described barb action is thus omitted. The setting assembly 4 with the peg carrier 22 and the coupling peg 20 can thus be taken out of the receiving shaft 50 or off of the adjustment turret 6. The blocking spring 46 is deflected in the pull-out direction in the process (see FIG. 5).

When the setting assembly 4 is being taken off, the blocking spring 46 furthermore also acts counter to the insertion direction. That is to say, the setting assembly 4 must, after the coupling peg 20 has been drawn out of the release position in the pull-out direction, be taken off of the adjustment turret 6, but at least the coupling peg 20 must be completely removed from the receiving shaft 50.

Figure 6:
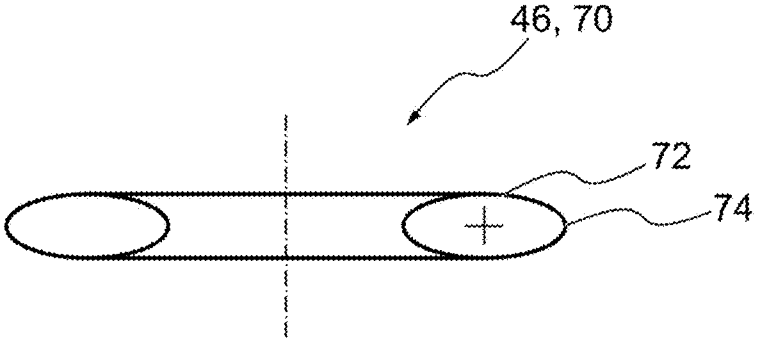
FIGS. 6 and 7 show a blocking spring of the adjustment turret according to an exemplary embodiment of the disclosure.
Figure 7:
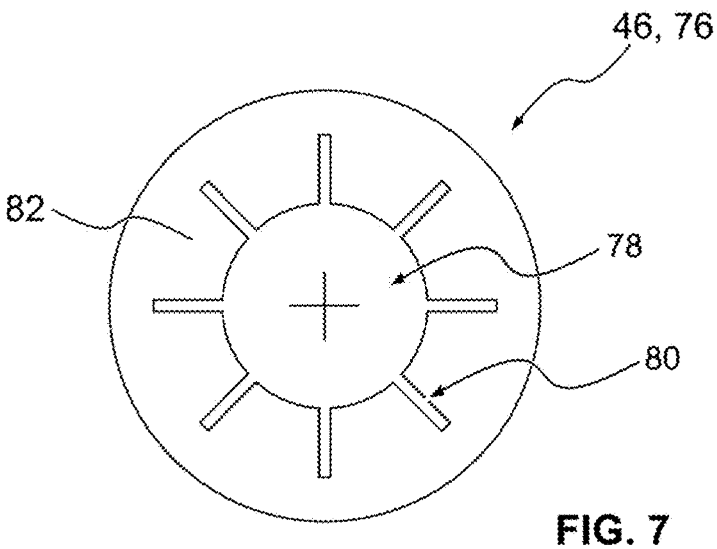

FIGS. 6 and 7 illustrate two exemplary embodiments for the blocking spring 46 in more detail. FIG. 6 shows a helical spring 70, which is wound to form a ring. The turns of the spring wire 72 are wound around a circular-ring contour 74 and in the process elliptically flattened (compressed in the axial direction). As a result, the helical spring 70 can be inclined or deflected as described above and thereby bring about the blocking action in the first annular groove 40.

FIG. 7 shows a diaphragm spring 76. It is formed by a type of plate spring (although it is not curved like a plate, but rather is flat) and has a central opening 78 and also radial slots 80, which define individual tongues 82. These tongues 82 are deflected by the coupling peg 20 and lock in the first annular groove 40 against its groove edge.

Figure 9:
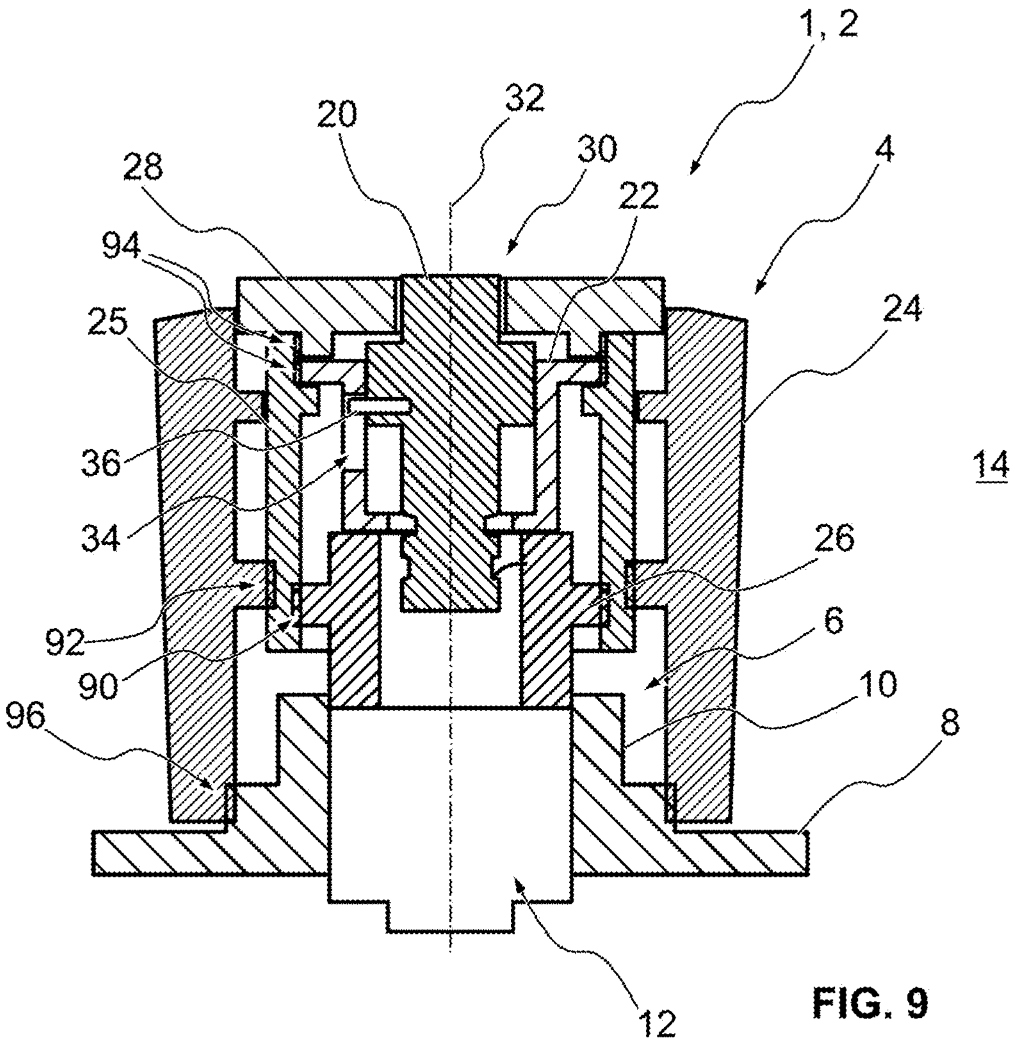
FIG. 9 shows a view according to FIG. 1 of the adjustment turret and the setting assembly in a more detailed illustration than FIG. 1.

FIG. 9 illustrates the setting assembly 4 and the adjustment mechanism 12, at least its spindle sleeve 26, in more detail. The spindle sleeve 26 is coupled to the intermediate piece 25 with a toothing, in particular a spur toothing 90 in a manner comparable to a spline connection, with the result that a turning of the intermediate piece 25 is transmitted to the spindle sleeve 26. The intermediate piece 25 similarly meshes with the outer ring 24, in particular likewise with a spur toothing 92 in a manner comparable to a spline connection, in order to be able to transmit the turning of the outer ring 24 to the intermediate piece 25 and thus to the spindle sleeve 26. The spur toothing 90 here enables straightforward mounting of the setting assembly 4 in that the intermediate piece 25 only needs to be pushed onto the toothing of the spindle sleeve 26. In the exemplary embodiment illustrated in FIG. 9, the intermediate piece 25 is connected to the peg carrier 22, and also the cover 28, specifically with a respective screwed connection 94.

According to an exemplary embodiment, which is likewise depicted by FIG. 9, the outer ring 24 and the adjustment turret 6, on its collar 10, have a further toothing 96 (in particular a spur toothing in the manner of a spline connection), which mesh with one another in a basic position (see FIG. 9) of the outer ring 24, with the result that the outer ring 24 is mounted on the adjustment turret 6 for conjoint rotation. For an adjustment of the reticle element 7, the outer ring 24 is first of all lifted off, i.e., displaced away from the housing 8. In the process, the toothing 96 and also the spur toothing 92 slide on one another, until the toothing 96 disengages from the mutual engagement. The spur toothing 92 remains in engagement. In this setting position, the outer ring 24 can be turned, as a result of which the turning is transmitted to the spindle sleeve 26, as described above.

The subject matter of the disclosure is not restricted to the exemplary embodiments described above. Rather, further embodiments of the disclosure can be derived from the above description by a person skilled in the art. In particular, the individual features of the disclosure that are described with reference to the various exemplary embodiments, and the design variants thereof, can also be combined with one another in a different way.

LIST OF REFERENCE NUMERALS

1 Telescopic sight system
2 Telescopic sight
4 Setting assembly
6 Adjustment turret
7 Reticle element
8 Housing
8*a* Objective lens assembly
8*b* Inverting system
8*c* Inner tube
8*d* Eyepiece
9 Optical axis
10 Collar
12 Adjustment mechanism
14 Outer side
20 Coupling peg
22 Peg carrier
24 Outer ring
25 Intermediate piece
26 Spindle sleeve
28 Cover
30 Tool opening
32 Longitudinal axis
34 Slotted-link groove
36 Slotted-link pin
40 Annular groove
42 Annular groove
44 End
46 Blocking spring
48 Groove
50 Receiving shaft
60 Fixing portion

62 Release portion
64 Free end
70 Helical spring
72 Spring wire
74 Circular-ring contour
76 Diaphragm spring
78 Opening
80 Slot
82 Tongue
90 Spur toothing
92 Spur toothing
94 Screwed connection
96 Toothing
B Spring width

What is claimed is:

1. A telescopic sight system having a telescopic sight for hunting and/or sports purposes, comprising:
- a housing;
- an objective lens assembly arranged in the housing;
- a reticle element arranged in the housing;
- an adjustment mechanism configured to adjust the reticle element relative to an image;
- at least one adjustment turret arranged on the housing and configured to accommodate the adjustment mechanism for manual and relative adjustment of the reticle element; and
- a setting assembly which can be coupled reversibly to the adjustment turret, the setting assembly including:
  - a coupling peg, and
  - a peg carrier, in which the coupling peg is adjustably mounted between a fixing position and a release position,
- wherein a receiving shaft configured to receive the coupling peg and a blocking spring are arranged in the adjustment turret,
- wherein the blocking spring projects laterally by a spring width into the receiving shaft,
- wherein the coupling peg has, along its longitudinal extent and at an axial spacing, a first annular groove and a second annular groove, a groove bottom of the first annular groove being arranged at a smaller spacing than the spring width from an outer edge of the receiving shaft and the second annular groove being recessed with respect to the first annular groove such that a groove bottom of the second annular groove is arranged at a larger spacing than the spring width or at least at a spacing approximating the spring width from the outer edge of the receiving shaft, and
- wherein the blocking spring is lying in the first annular groove when the coupling peg has been arranged in the fixing position, and is lying in the second annular groove when the coupling peg has been arranged in the release position.

2. The telescopic sight system as claimed in claim 1,
- wherein the coupling peg has a rotationally symmetrical form and is mounted on the peg carrier so as to be adjustable with respect to the peg carrier with a slotted link.

3. The telescopic sight system as claimed in claim 2,
- wherein the slotted link includes at least one slotted-link groove formed in the peg carrier, and a slotted-link pin, slidably received in the peg carrier and fastened in the coupling peg, and
- wherein the slotted-link groove has a release portion aligned parallel or at least virtually parallel to the longitudinal extent of the coupling peg and which points with a free end in the insertion direction of the adjustment turret, and a fixing portion, which is at an angle relative to said release portion.

4. The telescopic sight system as claimed in claim 3,
- wherein the fixing portion is aligned with a small gradient with respect to a plane radial to the coupling peg and with a free end pointing away from the insertion direction of the adjustment turret, and
- wherein the coupling peg is arranged in the fixing position when the slotted-link pin is arranged at the free end of the fixing portion.

5. The telescopic sight system as claimed in claim 1,
- wherein the coupling peg in the fixing position is braced by way of a groove edge of the first annular groove against the blocking spring or against being pulled out of the receiving shaft.

6. The telescopic sight system as claimed in one of claim 1,
- wherein the blocking spring is a toroidal helical spring or a radially coiled axial spring.

7. The telescopic sight system as claimed in claim 6,
- wherein the toroidal helical spring is flattened parallel to the coupling peg.

8. The telescopic sight system as claimed in claim 6,
- wherein an inside diameter of the toroidal helical spring, of the annular disk, or of the plate spring is less than an outside diameter of the groove bottom of the first annular groove, and
- wherein an outside diameter of the groove bottom of the second annular groove is less than the inside diameter of the toroidal helical spring, of the annular disk or of the plate spring.

9. The telescopic sight system as claimed in claim 1,
- wherein the blocking spring is an annular disk or a plate spring with a central opening or with tongues protruding inward from an edge region.

10. The telescopic sight system as claimed in claim 1,
- wherein the peg carrier is coupled to a structural element of the setting assembly, which encloses the peg carrier and the coupling peg in sleeve-like fashion, for conjoint rotation.

11. A method for mounting a telescopic sight system as claimed in claim 1, the method comprising:
- placing the setting assembly on the adjustment turret such that the coupling peg lies in the receiving shaft;
- inserting the coupling peg into the receiving shaft until the blocking spring snap-fits into the first annular groove; and
- subsequently turning the coupling peg,
- wherein the coupling peg moves along the slotted link thereby bracing the blocking spring against the groove edge of the first annular groove.

12. A method for dismounting setting assembly of the telescopic sight system as claimed in claim 1 from the telescopic sight, the method comprising:
- turning the coupling peg until the slotted-link pin has slid into the release portion;
- pushing the coupling peg in the insertion direction along the release portion, until the blocking spring lies in the second annular groove and is thereby moved back to its rest position; and
- subsequently taking the setting assembly off of the adjustment turret.

* * * * *